United States Patent
Bugbee

(10) Patent No.: US 8,503,679 B2
(45) Date of Patent: Aug. 6, 2013

(54) SHORT MESSAGE ENCRYPTION

(75) Inventor: Larry Bugbee, Kent, WA (US)

(73) Assignee: The Boeing Company, Chicago, IL (US)

( * ) Notice: Subject to any disclaimer, the term of this patent is extended or adjusted under 35 U.S.C. 154(b) by 1224 days.

(21) Appl. No.: 12/018,747

(22) Filed: Jan. 23, 2008

(65) Prior Publication Data

US 2009/0185677 A1    Jul. 23, 2009

(51) Int. Cl.
H04K 1/00 (2006.01)
H04K 1/04 (2006.01)
H04L 9/00 (2006.01)
H04L 9/28 (2006.01)
H04L 29/06 (2006.01)
H04L 9/32 (2006.01)

(52) U.S. Cl.
USPC ............. 380/269; 380/255; 380/262; 380/36; 380/37; 380/44; 380/28; 713/150; 713/165; 713/170; 713/171

(58) Field of Classification Search
USPC ................. 380/37, 255, 262, 269, 36, 44, 28; 713/150, 165, 170, 171
See application file for complete search history.

(56) References Cited

U.S. PATENT DOCUMENTS

| | | | |
|---|---|---|---|
| 7,779,482 B1 * | 8/2010 | Yen et al. | 726/30 |
| 7,827,408 B1 * | 11/2010 | Gehringer et al. | 713/170 |
| 2004/0225881 A1 * | 11/2004 | Walmsley et al. | 713/161 |
| 2005/0021941 A1 * | 1/2005 | Ohmori et al. | 713/156 |
| 2005/0166040 A1 * | 7/2005 | Walmsley | 713/150 |
| 2005/0210252 A1 * | 9/2005 | Freeman et al. | 713/171 |
| 2006/0126835 A1 * | 6/2006 | Kim et al. | 380/44 |
| 2006/0274643 A1 * | 12/2006 | Choyi et al. | 370/216 |
| 2007/0245147 A1 * | 10/2007 | Okeya | 713/181 |
| 2010/0262841 A1 * | 10/2010 | Ekberg et al. | 713/193 |

* cited by examiner

Primary Examiner — Aravind Moorthy
(74) Attorney, Agent, or Firm — Haynes and Boone, LLP

(57) ABSTRACT

A method and system for securely communicating information via a low bandwidth channel uses encryption that adds comparatively little overhead to the size of the transmission. This method and system efficiently take advantage of the properties of public key cryptography, a shared secret, a traffic key from the shared secret, an abbreviated initialization vector, and an abbreviated whole message signature. The information and the whole message signature are encrypted using the traffic key with a stream cipher.

25 Claims, 3 Drawing Sheets

Requested Send

SHORT MESSAGE ENCRYPTION

STATEMENT REGARDING FEDERALLY SPONSORED RESEARCH OR DEVELOPMENT

This invention was made with Government support under contract No. N00173-07-C-2007 awarded by the Naval Research Laboratory. The Government has certain rights in this invention.

TECHNICAL FIELD

The present invention relates generally to cryptography and, more particularly, to a method and system for providing comparatively strong encryption and for providing message integrity while minimizing additions to message length such that the invention is particularly well suited for use with short messages including those commonly used in low bandwidth environments, environments where jamming is expected, and other environments where a significant increase in message size is undesirable.

BACKGROUND

The use of encryption to enhance the security of communications is well known. Encryption is commonly used by the military, government agencies, defense contractors, and others to facilitate secret communications. Many commercial systems also utilize encryption. For example, banks use encryption to perform wire transfers, to provide access to account information, and in other applications. Encryption is commonly used in Internet commerce to facilitate sales transactions.

Encryption is the process of transforming information, such as text, from its original form into an encrypted form. Typically, the original form of the information can be readily understood and used. For example, text in the original form can be read. However, the same information in encrypted form is only usable to those who can reverse the encryption process, i.e., decrypt the information.

Original or unencrypted text is commonly referred to as plaintext. Encrypted text is commonly referred to as cyphertext. An encryption algorithm is used to transform plaintext into cyphertext. Similarly, a decryption algorithm is used to transform cyphertext into plaintext. A key is required in order for the encryption algorithm to transform plaintext into cyphertext and in order for the decryption algorithm to transform cyphertext into plaintext.

Although contemporary encryption has proven generally useful for its intended purposes, contemporary encryption does possess limitations that affect its usefulness in some applications. For example, contemporary encryption is not well suited for use in applications where short message length is desirable, such as in low bandwidth applications and in environments that are subject to jamming.

SUMMARY

Systems and methods are disclosed herein to provide secure communications without compromising message integrity when using short messages. Short messages can be desirable, for example, in low bandwidth environments, in environments where detection and jamming is expected, in environments where transmissions are paid for on a per character basis, and/or other environments where larger messages are costly or otherwise undesirable.

In accordance with an example of an embodiment, a method for encrypting information prior to communicating the information can comprise computing, determining, calculating, or otherwise defining a shared secret from public and private keys, defining a traffic key from the shared secret, and defining a nonce or an initialization vector. An abbreviated whole message authentication code for the information, and/or an abbreviated whole message hash for the information for the information can be defined. The information, as well as whole message authentication code, the abbreviated whole message hash, and/or a cyclic redundancy code (CRC) can be encrypted using the traffic key with a symmetric stream cipher. Various combinations of techniques defined herein can be used to strongly protect (encrypt and authenticate) a message with the addition of only a few bytes to the overall message length.

According to an example of an embodiment, a method of decryption can comprise defining a shared secret from public and private keys, defining a traffic key from the shared secret, and decrypting the information along with an abbreviated whole message authentication code, abbreviated whole message hash, and/or a CRC using the same cryptographic algorithm, the same initialization vector, and the same traffic key that was used to encrypt the information. The abbreviated message authentication code establishes, at some level of assurance, the message is authentic. If an abbreviated hash or a CRC is used, message integrity, at some level of assurance, can be provided.

According to an example of an embodiment, a system for providing secure communications can comprise a processor configured to perform encryption and/or decryption as described herein. For example, the system is particularly well suited for use in low bandwidth and other environments where secure, short messages are desired.

According to an example of an embodiment, a method for authenticating messages can comprise sending revocations as they occur to a plurality of certificate users so that the certificate users can optionally maintain a local certificate revocation list (CRL). The use of such a local certificate revocation list further reduces the traffic required to check the certificate revocation list prior to encrypting messages based on the recipient's public key, shared secret, or traffic key.

According to an example of an embodiment, a method is provided for efficiently validating the correctness of the local CRL. The local CRL can be corrected if necessary.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
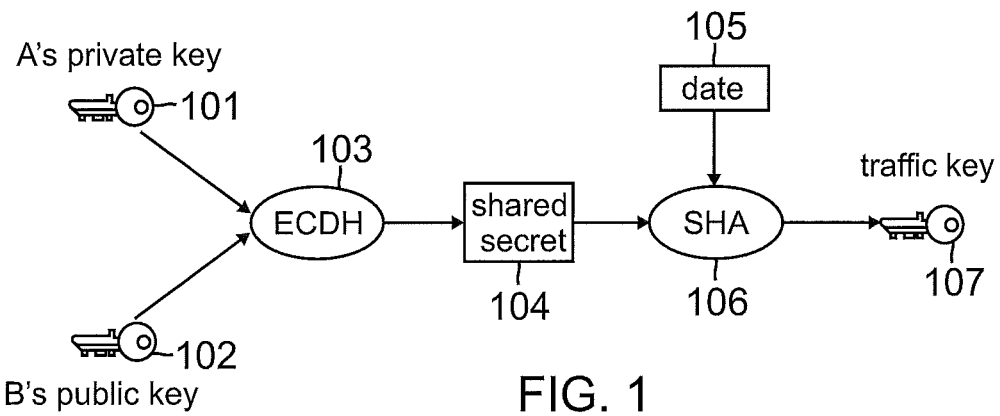
FIG. 1 is a block diagram showing the use of an elliptical curve Diffie-Hellman (ECDH) Key Agreement to provide a traffic key in accordance with an example of an embodiment.

The ability to communicate short messages securely while maintaining message integrity can be very important. For example, the use of short messages is typically desirable in low bandwidth environments, in environments that are subject to jamming, in environments where transmissions are paid for on a per character basis, in low-power environments such as radio frequency identification (RFID) chips, and in environments with high traffic volumes where total volume needs to be kept as small as possible. Communications with submarines are an example of a low bandwidth environment. Battlefields are examples of environments that are subject to jamming. Robot and mobile agent communications are other examples of where messages should be kept both short and secure.

Submarines must frequently use low bandwidth communications. Seawater attenuates higher frequency radios waves much more than lower frequency radio waves. Therefore, the deeper that a submarine is submerged, the lower the frequency of radio waves that must be used in communications.

Very low frequency (VLF) and extremely low frequency (ELF) radio waves can be used under water. VLF radio waves range from about 3 kHz to 30 kHz. VLF radio waves can penetrate seawater to a depth of approximately 20 meters. Submarines that are submerged at such shallow depths can use frequencies in the VLF range. ELF radio waves range from about 30 Hz to 300 Hz. Radio waves in the ELF frequency range can reach submarines at any depth.

However, according to Shannon's theorem, the channel capacity or bandwidth is largely determined by the frequency of a radio transmission. The use of lower frequencies severely limits bandwidth. Of course, communications using lower bandwidths contain less information and/or take longer. Thus, it is generally necessary to keep messages short when communicating in some environments.

It is also generally necessary to keep messages short when communicating in environments that are subject to jamming. For example, on the battlefield it is generally desirable to keep messages short to reduce the opportunity for the enemy to find and compromise the transmitter and/or jam its communications. Of course, maintaining security and integrity of communications in such situations is very important.

Many of the cryptographic primitives that we typically take for granted in common business scenarios produce large products (large message sizes), at least by short message standards. Public key cryptography is desirable from a key management point of view, but usually adds more bulk to a message than symmetric cryptography. The largest cryptographic contributors to message size, especially for small messages, are the public key signature and the public key encryption of the symmetric key. Indeed, the use of public key cryptography itself can motivate compromises. This is especially true because the signatures that are used in public key cryptography can tend to be undesirably long.

This size penalty on secure messages can cause communications system users to send less information than is desired, cause designers to use weaker cryptography than is appropriate, or in some instances, to use no cryptography at all. The ability to use short messages that are properly secured is advantageous.

Secret key or symmetric cryptography uses a single key for both encryption and decryption. The key must be kept secret since anyone with the key can decrypt the information. Symmetric cryptography is relatively efficient, but one disadvantage of symmetric cryptography is key management. When the two parties are widely separated from one another and no efficient, secure channel or process exists for distributing the key, each party must be able to derive the same key independently. With a large number of potential pairings of sender and receiver, the task of securely distributing the keys becomes a substantial problem.

Public-key or asymmetric cryptography mitigates this key management problem via the use of a public key and a private key. The public key is used to encrypt information and the private key is used to decrypt it. The public key and the private key are related to one another mathematically such that only the private key, and those that have it, can decrypt the information. The private key cannot be readily derived from the public key. The public key can be distributed to anyone, e.g., the public. The private key is kept secret. Unfortunately, public key cryptography is less efficient than symmetric cryptography as exhibited in its longer processing times and its larger artifacts. Keys, for example, are significantly larger, as are signature sizes.

Two examples of public key cryptosystems are Elliptical Curve Cryptography (ECC) and Rivest, Shamir, and Adleman (RSA). Of the two, ECC is more efficient, but both are less efficient than symmetric key cryptography. The use of symmetric encryption results in smaller message size increases when compared to the use of public key encryption. However, the increase in the size of a message can still be undesirably large even when symmetric encryption is used. This is particularly true when the message is very short. Symmetric algorithms are significantly more economical than their asymmetric counterparts.

One example of an embodiment takes advantage of public key cryptography to simplify the key management problem without the message size overhead of public key cryptography. Preserving many of the key management benefits, one embodiment makes use of symmetric cryptography by way of shared secrets. Because symmetric algorithms require that both parties have the same key, public and private keys can be generated, the public keys distributed, and each party can derive a shared secret using the other party's public key and their own private key.

This shared secret, in an embodiment, can be used directly as a secret encryption key. In an embodiment, the shared secret can be used to derive a secret traffic key with the benefit that if the secret symmetric encryption key were ever compromised, the shared secret and the public key pair would not need to be replaced.

A shared secret can be defined herein as any information that is shared between parties that desire to communicate securely and that is kept secret from all others. A shared secret can be a word, a phrase, a number (binary, decimal, or otherwise), an alpha-numeric string, or any other type of information. Generally, a shared secret can be considered to be a number because all types of information in computer systems can generally be regarded as numbers. In accordance with an example of an embodiment, the shared secret can be calculated using a key agreement algorithm, the public key of the recipient, and private key of the sender.

Referring now to FIG. 1, it is possible for two parties, each with a public key pair, to derive a common shared secret 104, known only to both parties. In one example, the shared secret 104 can be a shared secret number. According to the Diffie-Hellman Key Agreement (DHKA), described in the Internet Engineering Task Force (IETC) document RFC2631, both the sender and the intended receiver of a message have key pairs. RFC2361 recites "By combining one's private key and the other party's public key, both parties can compute the same shared secret number." The shared secret 104 can then be used by each party to independently generate the same traffic key 107. A traffic key 104 is a key that is use for a predetermined period of time, e.g., a day. This traffic key 107 is suitable for use as a secret key for symmetric encryption. A common technique is to use the Diffie-Hellman Key Agreement to establish the shared secret. More particularly, if we designate one party as A and the other party as B, then A can use A's private key 101 and B's public key 102 to define the shared secret 104.

An elliptical curve cryptography (ECC) variant of Diffie-Hellman, (referred to herein as ECDH 103) can be used to establish the shared secret 104 from A's private key 101 and B's public key 102 and thus facilitate the generation of the traffic key 107. Elliptic Curve Diffie-Hellman (ECDH) 103 can be used to securely define the shared secret 104 between two parties using an insecure channel.

The shared secret 104 can itself be used as the traffic key 107. The traffic key 107 can be defined securely because neither the traffic key 107 itself, nor any information from which the key can be derived, is transmitted over the insecure channel where it is susceptible to intercept. B's public key 102 can be transmitted over the insecure channel. However, this is acceptable because it is a public key and cannot readily be use to derive A's private key, the shared secret 104, or the traffic key 107 itself.

Alternatively, other ways of providing the shared secret and/or traffic key can be used. ECDH is just one example of a key agreement. Other key agreements can similarly be used. For example, the key agreement can be done using plain Diffie-Hellman (DH) or Rivest, Shamir, and Adleman (RSA) rather than elliptical curve Diffie-Hellman (ECDH). The use of elliptical curve cryptography for the key agreement can be advantageous due to the smaller public/private key size with respect to other key agreement methods.

Rather than using the shared secret 104 itself as the traffic key 107, it may be desirable to combine the shared secret 104 with other information, such as the time and/or date 105. A secure hash algorithm 106 can be used to form a hash of the shared secret 104 and/or date 105. The hash or information representative thereof can then be used as the traffic key 107.

Of course, B can generate traffic key 107 in the same manner that A did using B's private key and A's public key. Thus, each party can compute the shared secret 107 using their own private key and the other party's public key. By doing so, both parties derive the same number, i.e., the shared secret 104. The shared secret 104 can be used to generate symmetric keys that can be used for encryption and signing. Since the same traffic key 107 can be independently generated by two different parties, it can be used to encrypt and decrypt subsequent communications between the parties when using a symmetric key cipher.

According to an example of an embodiment, the result can be a 6-byte (48-bit) increase in message size when using 128 or 256 bit cryptographic strength. Because of the comparatively small increase in message size, this method allows messages to be sent securely in low bandwidth and other environments where short, secure messages are desired. Such messages can be sent with high confidence of confidentiality and reasonably high assurances of integrity and authenticity.

Embodiments can provide 128-bit, 256-bit, 512-bit, or any other desired cryptographic strength. Cryptographic strength varies by type of algorithm. For example, symmetric encryption key sizes are typically the same as the cryptographic strength. Corresponding hash algorithm and ECC key sizes typically need to be about twice as large for asymmetric encryption algorithms as for symmetric encryption algorithms to provide the same strength. For the sake of discussion, assume the cryptographic strengths and symmetric encryption sizes of 128, 192, and 256. The corresponding hash algorithm sizes would be 256, 384 and 512. As previously discussed, RSA is less efficient than ECC, and according to NIST, the equivalent RSA key size numbers are 3,072, 7,680 and 15,360.

A method and system for efficiently applying encryption and signatures to small messages can comprise registering devices (such as computers or communication devices) with a certificate authority, assigning pubic keys from the certificate authority to each device, assigning a private key to each device from the certificate authority, distributing public keys of each device to other authorized devices such that each device has a public/private key pair, calculating the shared secret using others' public key and own private key, maintaining the shared secret in a secure manner, and utilizing the shared secret as a secret key.

Figure 2:
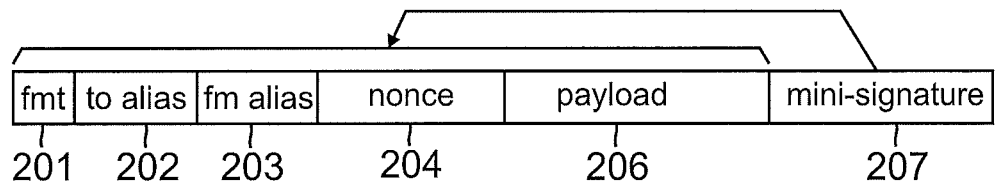
FIG. 2 is a drawing showing a message format in accordance with an example of an embodiment.

Referring now to FIG. 2, the process can further comprise receiving a message or payload 206 to be communicated via a non-secure channel. A message structure can be formatted to include fields such as format (fmt) 201, to_alias 202, from_alias (fm_alias) 203, nonce 204, payload 206, and mini-signature 207. According to an example of an embodiment, the fields of format (fmt) 201, to_alias 202, from_alias (fm_alias) 203, and nonce 204 can be plaintext, while the fields of payload 206 and mini-signature 207 can be ciphertext.

The to_alias 202, from_alias (fm_alias) 203 can be indices within a table. Thus, the to_alias 202, from_alias (fm_alias) 203 can be used to look upon other, or true, addresses within the table. The to_alias 202, from_alias (fm_alias) 203 can be IP addresses. Generally, the to_alias 202, from_alias (fm_alias) 203 can be comparatively short names (generally shorter than other names, such as the true names, that are commonly used to identify parties) that have some local uniqueness such that they adequately identify the sender and receiver of a message.

A traffic key identifier can comprise the to_alias and the fm_aliases. The to_alias and the fm_aliases can be used together to uniquely identify the traffic key allowing for a shorter nonce. This can be done without compromising the uniqueness of the nonce.

The format (fmt) field 201 can contain information regarding the format or message structure. For example, the format (fmt) field 201 can contain information representative of what fields are in what positions and the size of each field.

The to_alias field 202 can contain information representative of the destination of the message. Similarly, the from_alias (fm_alias) field 203 can contain information representative of the source of the message. The nonce 204 can be an ascension number, a random number or any other value that is not repeated with the same traffic key.

The payload 206 contains the message information to be transmitted. The payload 206 is representative of the original message that would otherwise be transmitted via the low bandwidth, non-secure channel.

The mini-signature 207 facilitates authentication of the message. For example, the mini-signature 207 can be a shortened form of a Message Authentication Code, perhaps a HMAC or CBC-MAC, incorporating the private key of the sender. Since the sender's private key was required to make the mini-signature and since the sender's private key is known only to the sender, there can be still be some confidence that the message was originated by the sender even though it is not full size. The mini-signature can even be replaced with a shortened hash or a CRC, but with arguably less security. Shortened MACs and hashes can, depending on the application, provide sufficient assurance, especially if transmitted inside the ciphertext. Likewise, total omission of a signature (MAC) or a hash is possible further reducing message sizes, but the user's assurance of integrity and authenticity will have to come from some other source.

Signatures and hashes can be shorted but with the understanding the shortened versions cannot provide the same levels of assurance or provide the same levels of confidence the message hasn't been altered. There are many ways to shorten a signature or a hash. One way to shorten is to simply truncate to the desired length. Another is to divide the signature or the hash into segments of the desired length and exclusive-or (XOR) the segments.

An example of an embodiment can comprise formatting a message structure (such as described above), generating an initialization vector, using a signing algorithm to create a signature, shortening the signature (as described above), concatenating said truncated mini-signature to the payload, and encrypting the payload, and mini-signature.

The initialization vector can be based on information that is not contained in the message. A nonce or an initialization vector can be communicated from the sender to the recipient, such as within the message. The initialization vector can be based upon the use of synchronized clocks. For example, the initialization vector can be dependent upon the time that the message is encrypted. Thus, if messages are not sent frequently, then the sending a nonce and/or an initialization vector is not always necessary.

Because the signature has been shortened to form the mini-signature 207, the message lacks, at least to some degree, the ability to verify the sender and content of the message. The loss is not total and sufficient assurances may be possible, depending on the application. However, embodiments can have varying sizes of mini-signatures, 4 bytes increased to 6 or 8 bytes for example, to provide varying degrees of assurance of knowing the signer and the authenticity of the message.

After adding the mini-signature, the message is encrypted and sent to the recipient. The above described process can be generally reversed on the receive side to decrypt and verify the authenticity of the message.

Embodiments facilitate the use of shorter messages while preserving advantages of public key cryptography and providing strong cryptographic strength. Such embodiments can be used in many applications and are particularly well suited for use in low bandwidth and other applications where it is desirable to keep overall message sizes short and secure.

It may be beneficial to discuss an example of an embodiment. For the example of an embodiment, let's assume we want to confidentially exchange authenticated messages in a potentially hostile environment. In this hostile environment low bandwidth communications may take a few seconds in order to send even a short message, confidentiality is required, and reasonable assurances of integrity and authentication are required. For this example, non-repudiation is not required and key escrow is not required. Key escrow requires the encryption key be given to a custodian and if this also be the signing key, a second key pair for signing should be created. The use of a second key pair adds complexity to this example, but does not negate it. Other embodiments can use key escrow, if desired.

Further, according to this example of an embodiment, 128-bit cryptographic strength is the strength requirement. The use of public key cryptography is one way to facilitate key management. There is either a public key infrastructure (PKI) and a suitable trust fabric or a closed system with a well known certificate authority (CA) and certificate revocation list (CRL).

This embodiment can make use of elliptical curve cryptography (ECC). Other public key algorithms are also suitable for embodiments. As those skilled in the art will appreciate, elliptic curve cryptography (ECC) is a public-key cryptography methodology that is based upon the algebraic structure of elliptic curves over finite fields. An elliptic curve is a plane curve that can be defined by the equation $y2=x3+a\ x+b$. The set of points on such a curve form an abelian group. If the coordinates x and y are chosen from a large finite field, the solutions form a finite abelian group. The discrete logarithm problem associated with elliptic curve groups is thought to be more difficult than the corresponding problem in the underlying finite field. Because of this characteristic, keys in elliptic curve cryptography can be much shorter than the keys of other public-key cryptography systems for the same level of cryptographic security. For this example, a 256-bit elliptical curve key pair is acceptable.

As discussed above, many of the cryptographic primitives we take for granted in common business scenarios produce large products. At least, the products are large by low bandwidth standards. The largest contributors to message size, especially for small messages, are the public key signature and the public key encryption of the symmetric key. The situation worsens if the Rivest, Shamir, and Adleman (RSA) algorithm is used instead of elliptical curve cryptography (ECC). When symmetric encryption is used the size additions are smaller, but can still be large in the context of very short messages. They include large-block initialization vectors (IVs) for 128-bit and larger block sizes, padding, and message authentication codes (MACs). For example, the size of an ECDSA-256 signature is 64 bytes which can easily dwarf the rest of the message under consideration. Further, X.509 certificates can contribute substantially to the size of a message.

According to this example of an embodiment, the goal is to provide a reduced size secure message format that retains the advantages of a public key cryptosystem. That is, security is maintained while tending to minimize an undesirable increase in overall message size due to overhead. This reduction in size better facilitates secure communications in low bandwidth environments, as well as in environments having perhaps higher bandwidths but with increased message volumes or a high cost per character transmission cost.

Since symmetric algorithms are significantly more economical than their asymmetric counterparts, one aspect of an embodiment is to use shared secrets, and in turn, symmetric cryptography. As discussed above, is possible for two parties, each with a public key pair, to derive a common shared secret, known only to both parties.

According to this example of an embodiment, the shared secret can be derived using a Diffie-Hellman Key Agreement. More particularly, the key can be derived using the ECC variant of Diffie-Hellman, ECDH. If each party computes the shared secret using their private key and the other party's public key, they will both derive the same number, a shared secret. The shared secret can be used to generate symmetric keys good for encryption and signing.

The shared secret itself can be used as the secret key, but not recommended. However, it can be advantageous to use the shared secret along with nonce (not the same nonce as nonce 204) such as the date and/or time, to derive a symmetric traffic key. This symmetric key can then be used to encrypt content, and to provide message authentication. For additional protection, the traffic key should be re-generated periodically, e.g., daily.

This embodiment also makes use of the Advanced Encryption Standard (AES) algorithm. Other ciphers are also suitable for embodiments. AES, also known as Rijndael, is a block cipher that has been adopted as an encryption standard by the U.S. government. AES was announced by National Institute of Standards and Technology (NIST) as U.S. FIPS PUB 197 (FIPS 197) on Nov. 26, 2001. It became effective as a standard May 26, 2002. For this example, AES-128 in counter mode (CTR) is an appropriate choice, but those believing the symmetric key should be twice the size of the desired cryptographic strength are free to use AES-256 without any penalty in message size for doing so.

The traffic key can be used to symmetrically encrypt the message and message authentication code (MAC). For example, a symmetric encryption algorithm from the NSA Suite B family of algorithms (AES-128/256) can be used. Suite B also includes hashing algorithms SHA-256/512, and the elliptical curve public key system ECC-256/521.

To reduce the size of a conventional initialization vector (IV), one can, for example, concatenate the to_alias 202 and the from_alias 203, the nonce 204 (not nonce), and the requisite number of nulls to form an IV. It is worthwhile to note that the IV need not be kept secret. However, the IV should be unique with respect to its traffic key. That is, the IV should not be reused with the same key. Changing the nonce changes the IV. Sending a 2-byte nonce in the message when the cipher's block size is 16 bytes, we have reduced the overall message size by 14 bytes.

A nonce can be an ascension number that is incremented for each message that is sent. The nonce can be reset when a new traffic key is used or when a predetermined maximum value thereof is reached. The nonce can be defined in any desired manner.

If the traffic key is changed daily or weekly, the likelihood that the nonce would be reused with the same key is mitigated. For added assurance, the nonce can be expanded to 3 or perhaps 4 bytes. Even with such an expanded nonce, this size is still much less than the 16 bytes or 32 byte IVs that are used with contemporary ciphers.

Block ciphers like AES require messages be padded up to the next larger block size. The size of the padding is a variable number of bytes up to the size of the cipher's block size, the mean of which is 8 bytes for a 128-bit block size. A stream cipher can be beneficial because stream ciphers do not require this additional padding. Further, a block cipher used in counter mode (CTR) effectively becomes a stream cipher. For this example AES-128 in CTR mode is a good choice.

If we focus on integrity and authentication, we can make use of symmetric key message authentication codes (MACs). A traditional digital signature could be used, but such signatures are large in size. Note too that a full length public key signature is what provides non-repudiation. Without the non-repudiation requirement, symmetric key MACs are sufficient.

There are several different types of MACs. For example, different types of MACS include Hash-based Message Authentication Code (HMAC), cipher block chaining (CBC-MAC), and one key cipher block chaining (OMAC). An abbreviated message authentication code, an abbreviated hash, or an abbreviated cyclic redundancy check 20 (CRC) can be used.

If the MAC covers the entire message and we were to put the signature inside the encryption, an abbreviated signature can be sufficient. A 4-byte mini-signature is proposed constituting a 28-byte savings over a SHA-256 HMAC of 32 bytes.

Rather than a MAC, a message integrity code (MIC) (which is no longer a signature according to the standard cryptographic use of the term) can be, for some applications, used inside the encrypted message. Indeed, in some applications other means of verifying message integrity, such as a cyclic redundancy check (CRC) may even be considered sufficient.

Thus, according to one or more embodiments, a short message can be securely encrypted with only a 6 byte penalty. Further, increasing the strength of the cryptography does not necessarily increase the length of the message.

Of course, the private key, the shared secret, and the derived symmetric key must remain secret on both the sender's and receiver's side. A compromise of any one of these items places communications in jeopardy. The integrity of CA is clearly a concern and the CA must be selected, secured and operated accordingly.

Each device or person, hereafter referred to as an entity, will need a set of keys, most notably a key pair from which shared secrets can be derived. The shared secret would then be the basis for creating a traffic key, perhaps changing daily. This traffic key need not change daily. However, periodic changes of the traffic key are generally desirable.

According to an example of an embodiment, for 128-bit design strength a symmetric key can be 256 bits. A hash function and an asymmetric key pair can also be 256 bits. This translates to AES-256 with a 128-bit block size, SHA-256, and ECC-256. The strength of cryptography is thus enhanced without the message size penalty that accompanies such strength according to contemporary practice.

Each entity can have its own public cryptography key pair. The invention will support two key pairs, one for signing and the other for encryption, and each pair will have its own shared secret and traffic key. Because key escrow is not a requirement for this example, one key pair may be used for both signing and encryption.

The private key is to be kept secret and will be used to decrypt and sign. The public key may be widely shared and will be used to encrypt and verify. In this example a 256-bit elliptical curve cryptography (ECC) key pair is generated. Most any proper elliptical curve may used, but we assume a 256-bit curve over a prime field (Fp), secp256r1, aka NIST P-256 (FIPS 186-2 change 1).

Public key cryptography works nicely and used extensively in commercial systems. Unfortunately commercial system data element sizes tend to be large by low bandwidth standards, so this invention makes use of symmetric cryptography all the while retaining the advantages of public key cryptography.

Because the key pairs are relatively static, the shared secret between the two entities is likewise static and need not be recomputed until one of the entities gets re-keyed. If ECC-256 key pairs are used, the Elliptical Curve Diffie-Hellman algorithm (ECDH) will create 256-bit shared secrets.

As discussed above, the shared secret should not to be used as a key directly. Rather, the shared secret can be used in combination with other information to create a traffic key. A detailed example of a method for creating a traffic key using the shared secret and other information is provided below.

One convenient way to create traffic keys is to hash the shared secret and some well known piece of periodically changing data, perhaps the date, and fold the result into the desired key length. Folding can be accomplished by splitting a larger value into segments of the desired length and XORing all of the segments.

For example, the SHA-256 hash algorithm can be applied to a concatenation of the shared secret and the date to produce a 256-bit digest value. Splitting it into two segments and XORing them together produces a 128-bit result that can be used as an AES-128 bit key. If a 256-bit key is wanted, folding is not required.

The use of AES in counter mode and the use of a nonce that is formed as described herein can provide message confidentiality while adding about 2 bytes to the overall message size. The same traffic key may be used with the mini-signature optimization to add message integrity and authenticity for another small 4-byte penalty. All messages internal to the system can have a binary format. External messages can have a non-binary format, such as XML.

The more important data elements are discussed in further detail below. The alias can be an element of a message. When we receive a message we need to retrieve the traffic key or compute one. Retrieval can require an index into a table or database, and the entity's identity may be used if short. Typically that is not the case, so a short alias is suggested. The alias may be assigned when the key pair is generated and may be well known. An alias can be a one or a two character code unique to the identity of the user or the device, an IP address, or any other unique identifier.

The nonce, as mentioned above, can also be an element of a message. The message can be encrypted using AES-128 in Counter Mode making a 16 byte nonce required, but not all 16 bytes need be transmitted. For example, a unique nonce can be constructed from the concatenation of the to_alias and the from_alias (perhaps IP addresses), a 2-byte nonce (perhaps an ascension number), and a complementary number of nulls. Only a 2-byte nonce need be transmitted. The IV need not be kept a secret. The nonce should not be repeated while using the same key which, in this example, changes daily.

A 2-byte random number nonce can only provide 65536 unique values per day per destination. While small, there is a possibility the same number will be reused. One example of a way to assure that the random nonce will be unique with every traffic key is to keep a cache of nonces used with the current traffic key, checking each new random number against the cache and purging the cache when a new traffic key is generated. Another way to assure the nonce is unique is to simply start with zero and increment the nonce once for each message sent, resetting to zero when a new traffic key is generated. This latter technique is often referred to as an ascension number.

The mini-signature can be an element of a message. The mini-signature is a shortened version of a full signature. A full signature covering the entire message provides good integrity protection and can be a message authentication code (MAC) such as a HMAC, CBC-MAC, and OMAC, as discussed above.

The mini-signature can be the 4-byte result of XORing a MAC divided into 4-byte chunks. An even quicker albeit less secure mini-signature would simply use the first 4 bytes of the MAC.

According to contemporary practice, messages are encrypted before they are signed. With long messages, this practice makes sense. One can discard unauthenticated messages before going to the trouble of decrypting them. With very short messages, this is no longer an important consideration. Further, message signatures outside the encryption must be full signatures to mitigate the likelihood of tampering.

A mini-signature placed inside the encryption and the simple act of decryption into something intelligible suggests it was the sending party that knew the symmetric key. That the mini-signature verified correctly provides additional assurance of integrity and authenticity. Questioning this property, one can argue a full length signature be required. The counter argument is that the message is kept fully confidential and that in some instances it is sufficient to only provide reasonable assurance of integrity and authenticity. The length of the mini-signature may be increased to 6 or 8 bytes if additional assurance is required.

A typical secure message format can vary to support the application's requirements, but in one embodiment, a secure message might comprise a header of 10 or 11 bytes that includes the optional message format field, the to_alias field, the from_alias (fm_alias), and the nonce. For example, an optional message format code can be 1 byte (where 0x00=a secure message and 0x01 unsecured message, for example). The to_alias might be 4 bytes. The from_alias (fm_alias) might be another 4 bytes. The nonce might be a 2-byte number. The payload may be of differing formats and sizes as appropriate to the application. The mini-signature might be 4 bytes and is only needed for authentication and integrity in secure messages. In this example, the total message length impact for securing a message might be 14 bytes.

In this embodiment the secure message can comprise a header of 11 bytes that includes the message format field, the to_alias field, the from_alias (fm_alias), and the nonce. The secure message can further comprise a message body of a payload of variable size, and a mini-signature of 4 bytes.

A signed and encrypted message may have the above format. The total message length is 16 bytes plus length of the payload. The 4-byte mini-signature should be sufficient to assure integrity and authenticity, and the encryption strength would be 128-bit. Note that security, in this example the nonce and the mini-signature, add only 6 bytes to a raw message. To further enhance security, all message types can be the same length, with shorter messages being padded with additional random content.

In one embodiment, all communications can be between client parties and a central server, or servers. In such an environment key management is simple because the servers can easily know all the party's public keys, and of course, the parties can know the server's public key. In other embodiments, client parties may have a need to communicate directly to one another with minimal support from the servers. Key management becomes more complex and usually involves the use of key certificates, certificates signed by a CA that bind the public key to a specific identity. Closed and open systems have different requirements and are discussed below.

A closed system can be defined herein to be a system in which all the parties are known to a common CA, all the certificates are signed by the common CA, and a custom, abbreviated certificate design is not problematic. In a closed system, the CA will be well known and trusted by all parties. There is no interoperability requirement outside these parties and as such, some key management operations can be simplified. Likewise, many data elements commonly found in X.509 certificates may be regarded as excess, ignored, and/or simply not used in an abbreviated certificate. In some embodiments, a number of mutually trustable CAs, each capable of supporting a common, custom certificate design, may be used in a closed system, but assuming only one CA simplifies the discussion.

An open system can be defined herein to be a system of CAs and participating parties that require full X.509 certificates for interoperability reasons. A full-sized X.509 certificate is usually in the order of 1400 bytes, far exceeding the size of other messages, making the open model less likely to be used in specialized environments where short message sizes are required.

The parties sending and receiving messages need to know the other's identity (or alias) and public key. As discussed above, the alias can be an address or other identifier that uniquely identifies a sender or recipient of a message. This information can be either preloaded or transmitted. The public keys of well-known and frequently used communication endpoints can be preloaded into an entity's keystore at key generation time and their shared secret may be calculated then as well.

In a closed system, certificates transmitting keys at time of need may be abbreviated and need only contain the public key and its owner's identity. Data elements such issuance and expiration dates, issuing CA, and CRL location may be either well known or simply not important.

Public keys may need to be communicated to various parties, especially when communications are necessary between parties that have no prior knowledge of the other's public key. This can be accomplished using abbreviated key certificates. In one embodiment, key certificates may be communicated directly using the direct-send method. In another embodiment, key certificates may be requested by the request-send method. The use of such a request-send protocol facilitates the use of shorter messages and negates the need for an initial certificate revocation list (CRL) check. Both of these methods for communicating key certificates are discussed below.

Figure 3:
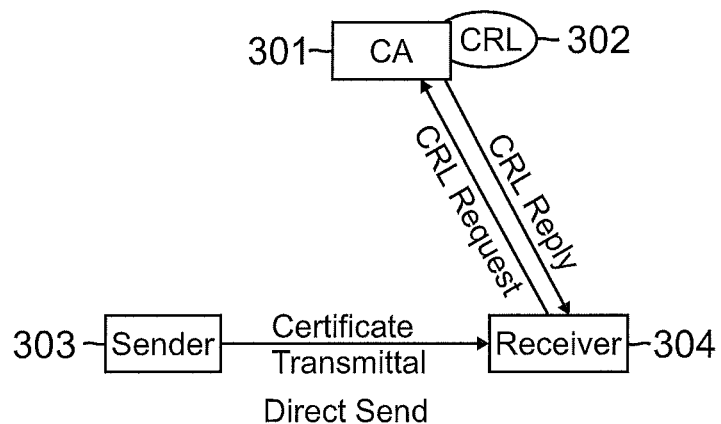
FIG. 3 is a block diagram showing key management for a direct-send in an open system in accordance with an example of an embodiment.

Referring now to FIG. 3, in a direct-send key certificate system, a message containing the certificate and is sent directly from the sender 303 to the receiver 304. In one embodiment the message need only contain a message header and a payload consisting of an identity, a public key, and a CA signature binding the identity and the public key. Specifically, the direct-send consists of a message format of 1 byte, a to_alias of 4 bytes, a from_alias (fm_alias) of 4 bytes, and a payload consisting of a message type of 1 byte, a certificate entity alias (identity) of 4 bytes, a public key of 32 bytes if ECC-256 is used, and the CA's signature of 64 bytes if ECDSA-256 is used. The message format does not rely on encryption, simply because the shared secret is not yet known by the receiver, and perhaps, not yet known by the sender. Nor is encryption necessary because the public key is intended to be public.

The receiving party 304, knowing the CA's public key, validates the certificate, but before using the public key to compute a shared secret, the receiver should be sure the sender's certificate has not, for some reason, been revoked. The receiver should check the CA's Certificate Revocations List (CRL) 302 by sending a query to the CA.

Figure 4:
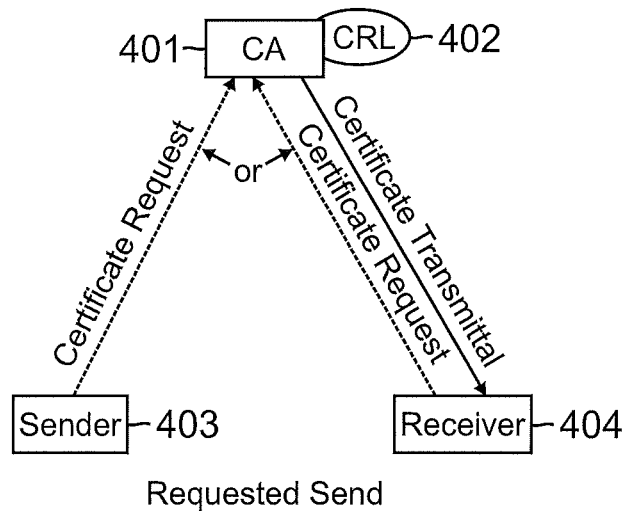
FIG. 4 is a block diagram showing key management for a request-send in a closed system in accordance with an example of an embodiment.

The direct-send message wrapper and the payload when using direct-send can be a little over 100 bytes. Transmittal time and possible bandwidth saturation, for example, may require the use of an even more efficient method, request-send, as discussed below. Referring now to FIG. 4, an embodiment of a request-send (of a certificate) uses a request that can be sent to the CA 401, initiated by either a sender 403 or a receiver 404. The CA can reply with the sender's public key information to the receiver. Unlike the direct-send method, if necessary, both the request and the CA's reply may be encrypted.

Since the key information is provided directly by the CA 401, there is no need for additional steps or messages to ensure the key has not been revoked. Thus, it is not necessary to communicate with the CRL 402 if there is intent to use the public key immediately. Perhaps more importantly, the combined length of both request-send messages is less than half of a direct-send certificate transmittal, and that does not include any CRL checking messages. Clearly, use of the request-send method is beneficial. Request-send does require, however, the CA 401 be able to respond in real time.

The request-send secure certificate request message can comprise a header of 11 bytes. The header can comprise a message format field, a to_alias field, a from_alias (fm_alias) field, and a nonce. The remainder of the request message can further comprise a message format of 1 byte, an entity alias of 4 bytes, a receiver entity alias of 4 bytes, and a mini-signature of 4 bytes. The entity alias represents the identity for which the public key is being sought, and the receiver alias is to whom the CA should send the public key.

A request-send secure certificate transmittal message can comprise a header of 11 bytes. The header can comprise a message format field, a to_alias field, a from_alias (fm_alias) field, and a nonce. The request-send secure certificate transmittal message can further comprise message format of 1 byte, a certificate entity alias of 4 bytes, an ECC public key of 32 bytes (assuming ECC-256 is used), and a mini-signature 4 bytes.

Both direct-send and request-send messages can optionally include a flag in the message indicating an expectation of ephemeral or long-term use. The receiver can cache accordingly.

Revocations occur when a certificate is to be considered no longer valid. In the direct-send scenario, the receiving party has verified the certificate to ensure it is authentic but must also check to be sure it is not revoked by checking against the CRL, further increasing the total traffic volumes. In the request-send scenario, checking against a CRL is implicit because the certificate transmittal message would not be sent by the CA if there were problems.

Regardless, whenever one entrusts valuable information to a receiver's encryption key, it is good practice to confirm the receiver's key has not been recently compromised and revoked. One way to do this is to send a CRL query and expect a reply stating the receiver is not revoked. In some applications, this might be viewed as unnecessary traffic. In low bandwidth environments especially, one needs to balance the downside risk of a revocation against how frequently the CRL is checked. Each application will vary in this regard.

In many situations, it can be argued that maintaining a local copy of the revocation list is more efficient than sending messages to check for revocation of a certificate prior to using the key.

According to an example of an embodiment an updated certificate revocation list can be maintained by a certificate user. The certificate revocation list can be sent to certificate users periodically. A certificate user can check a certificate against the local certificate revocation list prior to using a certificate to authenticate a message. Thus, the user does not need to contact a remote certificate revocation list in order to determine of a certificate has been revoked. Eliminating the need to contact a remote certificate revocation list can be advantageous, particularly when the remote certificate revocation list cannot be easily contacted, e.g., when the remote certificate revocation list server is down or when communications therewith are difficult or undesirable.

CRL queries and responses can appear reactionary, and downloading a CRL periodically can be inefficient. A proactive and more efficient approach might be for the CA to notify the users and servers of revoked identities as they occur.

Proactive revocation messages, along with positive acknowledgements thereof, can be used to create local certificate revocation lists. The use of local certificate revocation lists can substantially reduce the traffic needed to perform CRL checking prior to encrypting messages.

The CA can transmit messages identifying identities (aliases) whose keys are to no longer be trusted. Returned acknowledgements can be used to tell the server the revocation has been received, and the server would periodically try to re-send the revocation until a positive acknowledgement it received. All such transmissions must be authentic to help prevent insertions creating erroneous CRLs and thus denying communications to some users.

According to an example of an embodiment, a method for authenticating messages can comprise sending revocations as they occur to a plurality of certificate users so they can optionally maintain a local certificate revocation list (CRL). The use of a local certificate revocation list (CRL) further minimizes the amount of traffic required to check the certificate revocation list prior to encrypting messages based on the recipient's public key, shared secret, or traffic key.

The parties can use these revocation messages to maintain local lists of untrusted public keys, their derived shared secrets and the current traffic key. The proactive revocation messages combined with positive acknowledgement messages can make a practical revocation model that further reduces total network traffic over other embodiments.

For longer-term maintainability, this local list can be periodically compared with the official CRL. One inefficient approach would be to simply transmit the whole CRL periodically. One efficient embodiment would be periodically send and compare hashes of the local and CA CRLs. Upon finding a disagreement, either the whole CRL could be transmitted, or more elaborate schemes employed to isolate the area or areas where the CRLs disagree. According to an example of an embodiment, a hash of a canonical form of the CRL can be sent by the CA periodically and the hash can be used by the local user to determine if the local CRL is correct. If the CRL is not correct, then the CA can be notified and the complete CRL can be downloaded. If the CRL is relatively long, the CA can divide the CRL into segments, canonically hash each segment, and send the segment hashes to the user. The user can then request that only the needed segments be downloaded. Downloading only the needed segments can save transmission time and other costs.

Re-keying can be necessary when a certificate is determined to have been revoked. Perhaps the application is such that re-keying will be unnecessary which certainly simplifies the design. Should re-keying seem necessary, consider this. Re-keying requires generating a new key pair, sending the new public key, along with the entity's identity, to the CA via a trusted process. Re-keying voids all the existing shared secrets and necessitates distributing the new public key to all who need it. And remember, in some environments a trusted process may simply not be available making re-keying not an option.

The request-send can be used to efficiently cause the CA to send any newly re-keyed public keys. If the CA were to maintain a list of who needs which keys, made possible by keeping track of the keys requested, the CA can send replacement key certificates. Again, a positive acknowledge scheme can facilitate any necessary retransmissions. It is possible not all message recipients will get the needed keys, but the result is not catastrophic. Receivers of undecipherable messages need only request the CA send them the new public keys.

Figure 5:
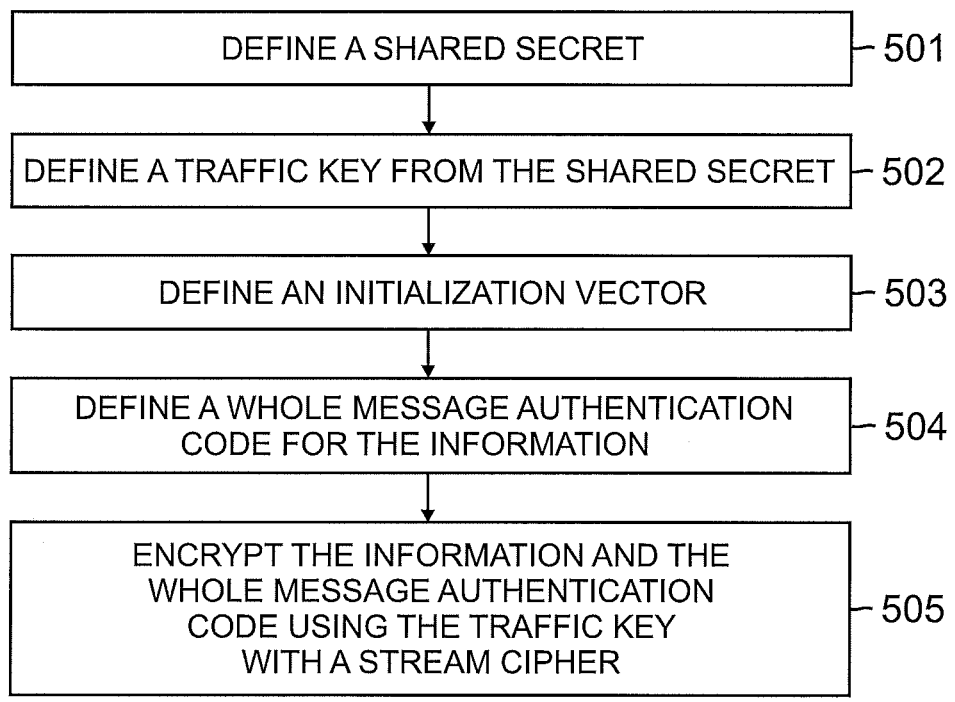
FIG. 5 is a flow chart showing the encryption process in accordance with an example of an embodiment of the present invention.

Referring now to FIG. 5, encrypting information for transmission via a low bandwidth channel and other environments where secure, short messages are desired can comprise defining a shared secret as indicated in block 501. A traffic key can then be defined from the shared secret, as indicated in block 502. An initialization vector can be defined, as indicated in block 503. A whole message authentication code can be defined, as indicated in block 504.

The information and the whole message authentication code can be encrypted using the traffic key, as indicated in block 505. A stream cipher can be used without padding.

In one embodiment, a stream cipher is a symmetric cipher in which plaintext bits are combined with a pseudorandom cipher bit stream. This combination is typically accomplished using an exclusive-or (XOR) operation. In a stream cipher the plaintext is encrypted one character at a time. Stream ciphers are contrasted with block ciphers. In a block ciphers the plaintext is encrypted one block at a time rather than one character at a time. Block ciphers can be made to behave like a stream cipher using modes. One such mode is Counter Mode (CTR) which permits the same XOR operation be performed.

Figure 6:
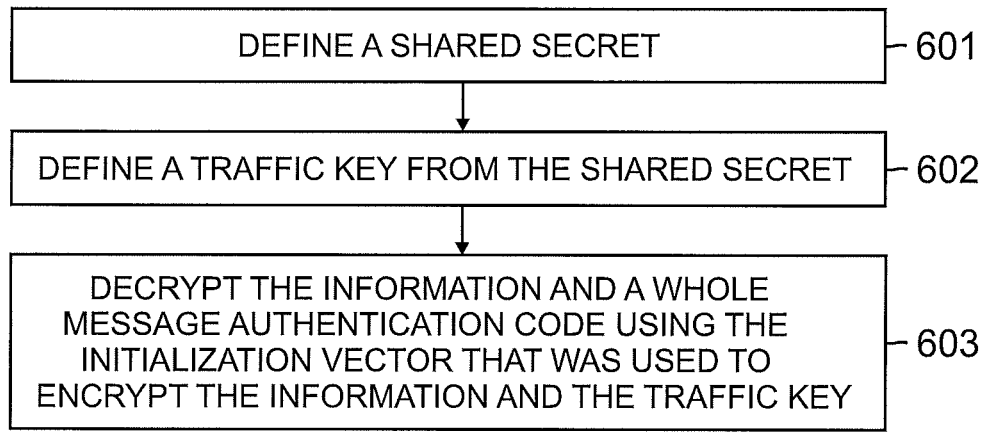
FIG. 6 is a flow chart showing the decryption process in accordance with an example of an embodiment of the present invention.

Referring now to FIG. 6, decrypting information such as that which has been transmitted via a low bandwidth channel can comprise defining a shared secret as indicated in block 601. This will be a shared secret computed in a slightly different manner resulting in the same shared secret value that was used to define the traffic key used to encrypt the information, as discussed with respect to FIG. 5 above. The traffic key can then be defined from the shared secret, as indicated in block 202. This will be the same traffic key used to encrypt the information, as discussed with respect to FIG. 5 above.

The traffic key is used to decrypt the information and the whole message authentication code. The same initialization vector that was used to encrypt the information is used to decrypt the information.

Figure 7:
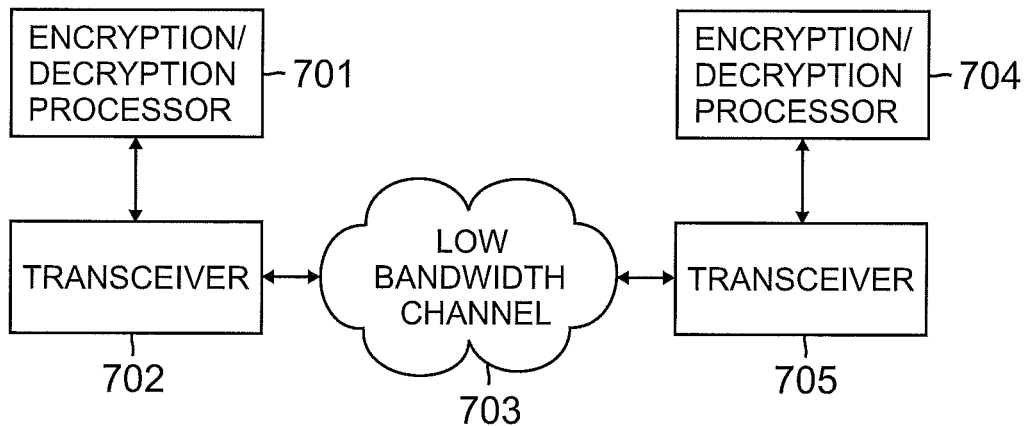
FIG. 7 is a block diagram showing the use of encryption in a low bandwidth environment in accordance with an example of an embodiment of the present invention.

Referring now to FIG. 7, one encryption/decryption processor 701 encrypts information prior to a transceiver 702 sending the information via a low bandwidth channel 703 to another transceiver 705. The information can be encrypted using the procedure shown in the flow chart of FIG. 5. Encrypted information received by transceiver 705 can be decrypted by encryption/decryption processor 704 using the procedure shown in the flow chart of FIG. 6.

According to one or more embodiments, comparatively strong cryptography can be used in situations where message length must be kept short, e.g., low bandwidth environments, environments that are subject to jamming, or there is otherwise a cost associated with larger messages. Short messages can be encrypted and authenticated with a very small penalty in message length and transmission time. The use of public key pairs, shared secrets, daily traffic keys, CTR mode encryption, creative nonce schemes, mini-signatures inside the encryption, and aliases in lieu of full identities provide comparatively strong encryption and reasonable authentication with only a 6-byte penalty in message sizes. And the basic message size does not vary whether striving for 128, 192, or 256-bit cryptographic strength.

According to an example of an embodiment, if the message has recognizable content when decrypted and one can argue forgoing the authentication and integrity requirement, the message size penalty, the nonce, can be as small as 1 byte to strongly encrypt up to 256 messages per traffic key per traffic key identifier. If more than 256 messages for the same traffic key are expected, then the nonce can 1 byte or 2 bytes. The nonce can be defined such that if the high-order bit is zero, then the nonce can be 7 bits long and have a value of 0-127 and if the high-order bit is 1, then the nonce can be 15 bits long and have a value of 0-32767. Thus, a 1 or 2 byte nonce facilitates encryption of up to a strength of 256 bits, which is the strongest generally discussed today for any purpose, including Top Secret. Examples provided herein are discussed on a byte level. However, those skilled in the art will appreciate that embodiments can operate on a bit level, a byte level, a word level and/or on any other desired level.

Further, data sizes discussed herein are by way of example only and not by way of limitation. For example, aliases can be 4 bytes long or can be of any other length. In some applications, aliases can be shorter than 4 bytes long.

In some instances, no initialization vector is required. For example, when using a stream cipher, only a nonce may be needed. Generally, either an initialization or a nonce is required.

The format definitions of most embodiments can be oriented to byte boundaries and are arguably the most common case. In some environments, especially in low power applications, field definitions can be expressed in the number of bits, and are not necessarily divisible by 8. In some environments it is desirable to shorten messages to the bare minimum and any bit length appropriate to the application is acceptable.

One or more embodiments of the invention may add confidentiality and authenticity to messages without substantially adversely affecting message size and transmission time. Other embodiments might be motivated by minimizing expenses, especially when billed on the number of characters sent or received. Embodiments facilitate the synergetic use of asymmetric and symmetric cryptography to enable secure communications, especially for short messages, such as when using low bandwidth systems or when in an environment that is subject to jamming. When using low bandwidth systems, perhaps caused by jamming, short messages can be desirable. Other applications of one or more embodiments include use in mobile agents and robotics.

Embodiments described above illustrate but do not limit the invention. It should also be understood that numerous modifications and variations are possible in accordance with the principles of the present invention. Accordingly, the scope of the invention is defined only by the following claims.

I claim:

1. A method for encrypting information carried in a transmission between a source and a destination, the method comprising:
    defining a shared secret using a public key for the destination and a private key for the source;
    defining a traffic key from the shared secret and a first nonce;
    deriving a message authentication code (MAC) at least in part from the information using the traffic key or the private key of the source;
    processing the MAC to obtain an abbreviated MAC, wherein the abbreviated MAC has fewer bits than the MAC;
    generating an initialization vector based at least in part on a second nonce, wherein the second nonce has fewer bits than the initialization vector;
    encrypting the information along with the abbreviated MAC using the traffic key and the initialization vector, the encryption being performed according to a symmetric cipher; and
    transmitting the encrypted information, the encrypted abbreviated MAC, and the second nonce in a message from the source to the destination.

2. The method as recited in claim 1, wherein the shared secret is derived using a Diffie-Hellman Key Agreement algorithm.

3. The method as recited in claim 1, wherein the shared secret is derived using an elliptical curve cryptography (ECC) variant of Diffie-Hellman Key Agreement algorithm.

4. The method as recited in claim 1, wherein:
    the message further comprises a to_alias field and a from_alias field;
    the to_alias is an alias of a true identifier for the destination and is shorter than the true identifier for the destination; and
    the from_alias is an alias of a true identifier for the source and is shorter than the true identifier for the source.

5. The method as recited in claim 4, wherein the initialization vector comprises a concatenation of the to_alias, the from_alias and the second nonce.

6. The method as recited in claim 4, wherein the MAC is derived from data comprising the information, the to_alias, the from_alias, and the second nonce.

7. The method as recited in claim 1, wherein the initialization vector is further based on information not contained in the message.

8. The method as recited in claim 1, wherein the information is encrypted using a traffic key having between 128 bit and 256 bit cryptographic strength.

9. The method as recited in claim 1, wherein the information is encrypted using an encryption algorithm selected from the National Security Agency (NSA) Suite B family of algorithms.

10. The method as recited in claim 1, wherein the encrypted abbreviated MAC and the second nonce add six bytes to the size of the message.

11. The method as recited in claim 1, wherein the shared secret is a number.

12. The method as recited in claim 1, wherein encrypting the information and the abbreviated MAC is performed without padding the message.

13. The method as recited in claim 12, wherein the encrypting is performed by use of a block cipher in counter mode.

14. The method as recited in claim 1, wherein the processing the MAC comprises truncating the MAC to obtain the abbreviated MAC.

15. The method as recited in claim 1, wherein the processing the MAC comprises:
    dividing the MAC into segments; and
    calculating an exclusive-or (XOR) of the segments to obtain the abbreviated MAC.

16. The method as recited in claim 1, wherein the first nonce is data indicative of a current date and/or time.

17. A method of decrypting information carried in a transmission between a source and a destination, the method comprising:
    defining a shared secret using a public key for the source and a private key for the destination;
    defining a traffic key from the shared secret and a first nonce;
    at the destination, receiving the transmission, wherein the transmission includes encrypted information, an encrypted first abbreviated message authentication code (MAC), and a plaintext second nonce;
    at the destination, deriving an initialization vector from the second nonce, wherein the second nonce has fewer bits than the initialization vector;
    decrypting the information and the first abbreviated MAC using the initialization vector and the traffic key according to a symmetric cipher;
    deriving a message authentication code (MAC) at least in part from the decrypted information using the traffic key or the public key of the source;

processing the MAC to obtain a second abbreviated MAC, wherein the first and second abbreviated MACs each have fewer bits than the MAC; and
authenticating the transmission by comparing the first and second abbreviated MACs.

18. The method as recited in claim 17, wherein the shared secret is derived using an elliptical curve cryptography (ECC) variant of Diffie-Hellman Key Agreement algorithm.

19. The method as recited in claim 17, wherein:
the message further comprises a to_alias field and a from_alias field;
the to_alias is an alias of a true identifier for the destination and is shorter than the true identifier for the destination; and
the from_alias is an alias of a true identifier for the source and is shorter than the true identifier for the source.

20. The method as recited in claim 17, wherein the symmetric cipher is performed without padding by use of a block cipher in a counter mode.

21. The method as recited in claim 17, wherein the public key of the source is received at the destination from a certificate authority (CA), thereby negating a need for the destination to query a certificate revocation list (CRL) of the CA to check whether the public key is valid.

22. The method as recited in claim 17, wherein the public key of the source is received at the destination from the source.

23. The method as recited in claim 17, wherein the processing the MAC comprises truncating the MAC to obtain the second abbreviated MAC.

24. The method as recited in claim 17, wherein the processing the MAC comprises:
dividing the MAC into segments and
calculating an exclusive-or (XOR) of the segments to obtain the second abbreviated MAC.

25. The method as recited in claim 17, wherein the first nonce is data indicative of a current date and/or time.

* * * * *